(12) United States Patent
Ronan

(10) Patent No.: US 11,746,702 B2
(45) Date of Patent: Sep. 5, 2023

(54) INVERSE MODULATION OF SECONDARY BLEED

(71) Applicant: RAYTHEON TECHNOLOGIES CORPORATION, Farmington, CT (US)

(72) Inventor: Michael Ronan, East Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/558,907

(22) Filed: Dec. 22, 2021

(65) Prior Publication Data
US 2022/0106910 A1    Apr. 7, 2022

Related U.S. Application Data

(62) Division of application No. 15/175,073, filed on Jun. 7, 2016, now Pat. No. 11,434,822.

(60) Provisional application No. 62/181,792, filed on Jun. 19, 2015.

(51) Int. Cl.
| | | |
|---|---|---|
| *F02C 7/18* | (2006.01) | |
| *F02K 3/06* | (2006.01) | |
| *F02C 6/08* | (2006.01) | |
| *F02K 1/78* | (2006.01) | |

(52) U.S. Cl.
CPC ............. *F02C 7/18* (2013.01); *F02C 6/08* (2013.01); *F02K 1/78* (2013.01); *F02K 3/06* (2013.01); *F05D 2260/20* (2013.01)

(58) Field of Classification Search
CPC ...... F02C 9/18; F02C 7/18; F02C 6/08; F02K 1/78
See application file for complete search history.

(56) References Cited

U.S. PATENT DOCUMENTS

| | | |
|---|---|---|
| 6,325,595 B1 | 12/2001 | Breeze-Stringfellow |
| 7,607,308 B2 | 10/2009 | Kraft et al. |
| 8,024,935 B2 | 9/2011 | Hoover et al. |
| 8,726,673 B2 | 5/2014 | Peters et al. |
| 8,834,108 B2 | 9/2014 | Negulescu |

(Continued)

FOREIGN PATENT DOCUMENTS

| | | |
|---|---|---|
| EP | 0288356 | 10/1988 |
| EP | 2604807 | 6/2013 |

OTHER PUBLICATIONS

European Search Report for European Patent Application No. 16175125 completed Nov. 7, 2016.

*Primary Examiner* — Katheryn A Malatek
(74) *Attorney, Agent, or Firm* — Carlson, Gaskey & Olds, P.C.

(57) ABSTRACT

A cooling arrangement for a gas turbine engine according to an example of the present disclosure includes, among other things, an offtake duct that has an offtake inlet coupled to a cooling source, the offtake duct defining a throat, and a valve downstream of the throat. The valve couples the offtake duct and a first cooling flow path. The valve is operable to selectively modulate flow through the offtake duct. A bleed passage includes a bleed inlet coupling the offtake duct and a second cooling flow path. The bleed inlet is defined at a location between the offtake inlet and the throat, inclusive. A method of cooling a propulsion system is also disclosed.

21 Claims, 4 Drawing Sheets

(56) References Cited

U.S. PATENT DOCUMENTS

| | | |
|---|---|---|
| 2002/0005038 A1 | 1/2002 | Boeck |
| 2006/0277919 A1 | 12/2006 | Martensson et al. |
| 2010/0215481 A1 | 8/2010 | Negulescu |
| 2012/0272658 A1* | 11/2012 | Murphy ................ F02C 7/185 165/96 |
| 2014/0248119 A1 | 9/2014 | Jen et al. |
| 2015/0252683 A1* | 9/2015 | Hasting .................... F02C 6/08 415/176 |
| 2015/0330236 A1 | 11/2015 | Beecroft et al. |
| 2016/0069273 A1 | 3/2016 | Burghardt et al. |
| 2016/0326957 A1* | 11/2016 | Feulner ................ F04D 29/701 |

* cited by examiner

INVERSE MODULATION OF SECONDARY BLEED

CROSS REFERENCE TO RELATED APPLICATIONS

This application is a divisional of U.S. patent application Ser. No. 15/175,073 filed Jun. 7, 2016, which claims the benefit of U.S. Provisional Patent Application No. 62/181,792, filed Jun. 19, 2015.

BACKGROUND

This disclosure relates to cooling of gas turbine engine components, and more particularly to modulation of cooling airflow.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Cooling schemes can be utilized to cool various components of the engine.

SUMMARY

A cooling arrangement for a gas turbine engine according to an example of the present disclosure includes an offtake duct that has an offtake inlet coupled to a cooling source, the offtake duct defining a throat, and a valve downstream of the throat. The valve couples the offtake duct and a first cooling flow path. The valve is operable to selectively modulate flow through the offtake duct. A bleed passage includes a bleed inlet coupling the offtake duct and a second cooling flow path. The bleed inlet is defined at a location between the offtake inlet and the throat, inclusive.

In a further embodiment of any of the foregoing embodiments, the cooling source is a bypass flow path defined by a fan nacelle.

In a further embodiment of any of the foregoing embodiments, the bleed inlet is defined at the throat.

In a further embodiment of any of the foregoing embodiments, the throat is defined at the offtake inlet.

In a further embodiment of any of the foregoing embodiments, the offtake duct defines a duct axis between the offtake inlet and the valve. The offtake duct converges along the duct axis from the offtake inlet to the throat.

In a further embodiment of any of the foregoing embodiments, the offtake duct diverges along the duct axis from the throat towards the valve.

In a further embodiment of any of the foregoing embodiments, the bleed passage defines a passage axis oriented transversely relative to a localized surface region of the offtake duct.

In a further embodiment of any of the foregoing embodiments, the bleed inlet is spaced from the offtake inlet.

A further embodiment of any of the foregoing embodiment, the cooling arrangement includes a second valve in the bleed passage.

A propulsion system according to an example of the present disclosure include a fan section coupled to a core engine, a nacelle assembly mounted at least partially about at least one of the core engine and the fan section, and a cooling assembly that has an offtake duct including an offtake inlet coupled to the nacelle assembly. The offtake duct defines a throat, and a valve couples the offtake duct and a first cooling flow path. The valve is operable to selectively modulate flow through the offtake duct. A bleed passage includes a bleed inlet coupling the offtake duct and a second cooling flow path. The bleed inlet is defined at a location between the offtake inlet and the throat, inclusive.

In a further embodiment of any of the foregoing embodiments, the nacelle assembly defines a bypass flow path coupled to the offtake inlet.

In a further embodiment of any of the foregoing embodiments, the offtake inlet is defined at an inner diameter of the bypass flow path.

In a further embodiment of any of the foregoing embodiments, the offtake inlet is substantially flush with surfaces of the nacelle assembly defining the bypass flow path.

In a further embodiment of any of the foregoing embodiments, the bleed inlet is defined at the throat.

In a further embodiment of any of the foregoing embodiments, the first cooling flow path is coupled to a first system. The second cooling flow path is coupled to a second system, and the second system is configured to modulate flow through the first cooling flow path.

In a further embodiment of any of the foregoing embodiments, the bleed inlet is defined at the throat.

In a further embodiment of any of the foregoing embodiments, the offtake duct and the bleed inlet are configured such that flow through the first cooling flow path is greater than flow through the second cooling flow path when the valve is in an open position.

A further embodiment of any of the foregoing embodiments, the propulsion system includes a second valve in the bleed passage.

A method of cooling a propulsion system according to an example of the present disclosure includes communicating airflow to an offtake inlet of an offtake duct, the offtake duct defining a throat modulating airflow between the offtake duct and a first cooling flow path, and diverting a portion of the airflow from the offtake duct to a bleed passage. The bleed passage includes a bleed inlet coupling the offtake duct and a second cooling flow path. The bleed inlet is defined at a location between the offtake inlet and the throat, inclusive.

In a further embodiment of any of the foregoing embodiments, the step of diverting the portion of the airflow occurs in response to the step of modulating the airflow through the offtake duct.

In a further embodiment of any of the foregoing embodiments, the bleed inlet is defined at the throat.

In a further embodiment of any of the foregoing embodiments, the airflow is communicated from a bypass flow path defined by a fan nacelle.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION

Figure 1:
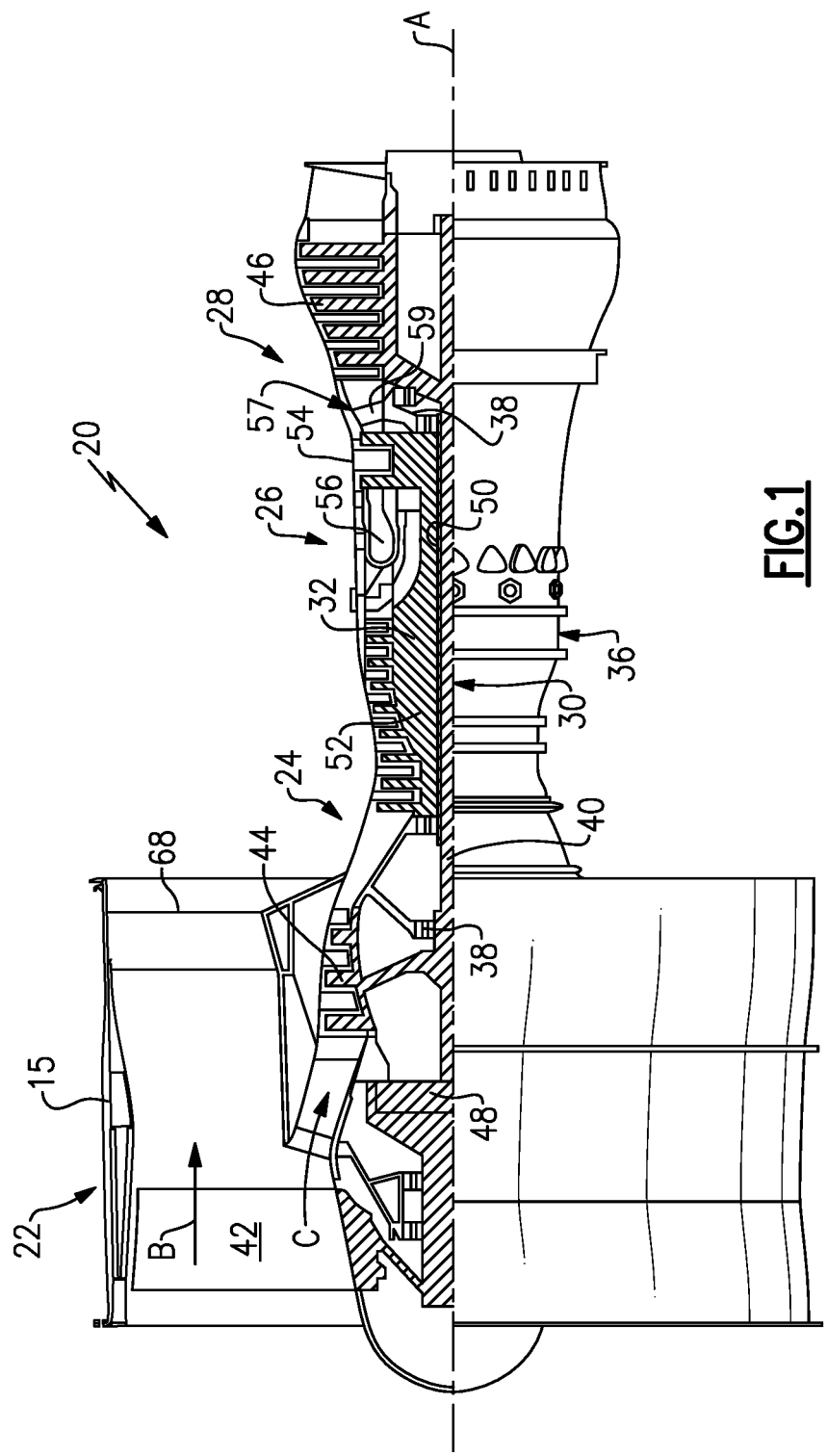
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle or fan case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a first (or high) pressure turbine 54. A combustor 56 is arranged in exemplary gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R]^{0.5}$. The "Low corrected fan tip speed" as disclosed herein according to one non-limiting embodiment is less than about 1150 ft/second.

Figure 2:
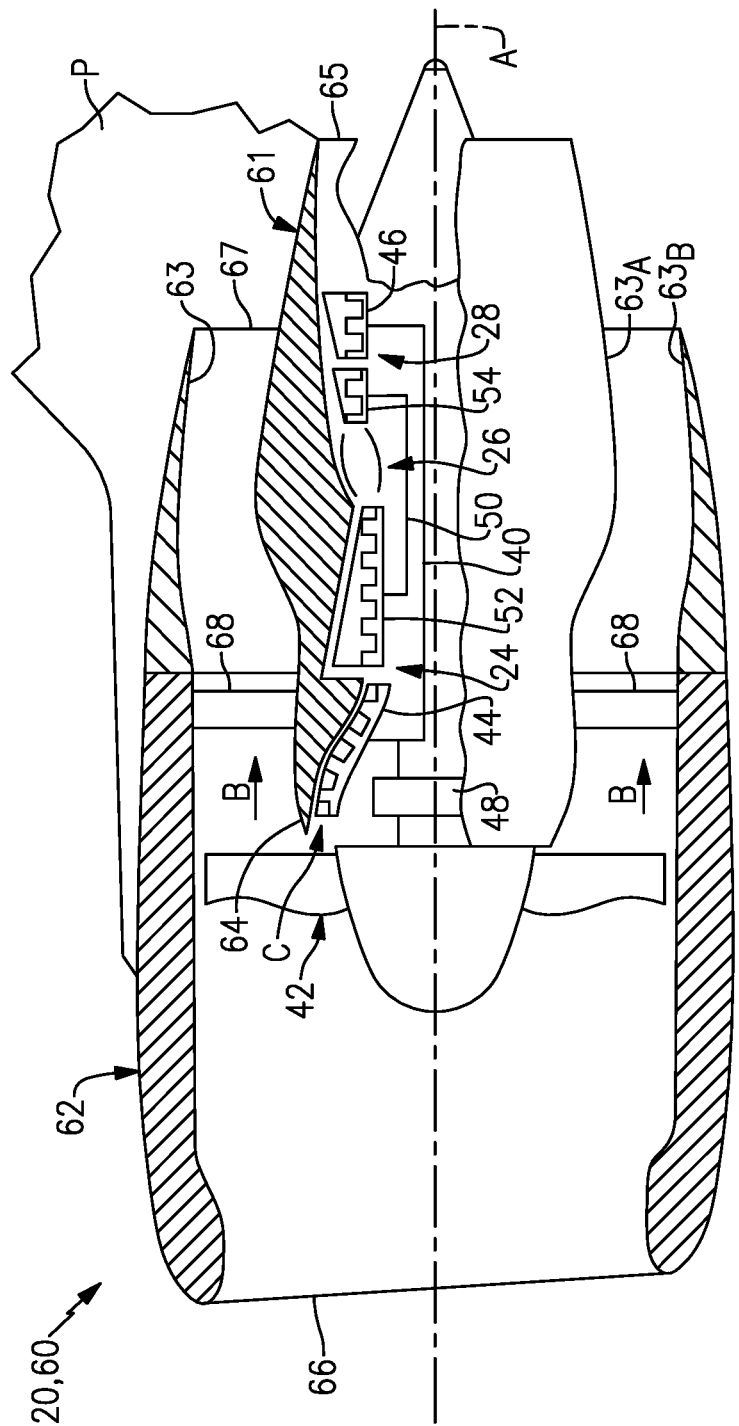
FIG. 2 is a schematic view of an example nacelle assembly.

Referring to FIG. 2, a nacelle assembly 60 is shown disposed about the engine axis A. In this disclosure, like reference numerals designate like elements where appropriate and reference numerals with the addition of one-hundred or multiples thereof designate modified elements that are understood to incorporate the same features and benefits of the corresponding original elements. The nacelle assembly 60 includes a core cowling 61, a fan nacelle 62 and a bypass duct 63 defining the bypass flow path B. The nacelle assembly 60 can be coupled to a pylon P. The core cowling 61 extends circumferentially around and at least partially houses the engine sections 24, 26, 28 and geared architecture 48. The core cowling 61 extends axially along the engine axis A between a core inlet 64 and a core nozzle 65 of the core flow path C downstream of the core inlet 64.

The fan nacelle 62 extends circumferentially around and houses the fan 42 and at least a portion of the core cowling 61, thereby defining the bypass flow path B. The fan nacelle 62 extends axially along the engine axis A between a nacelle inlet 66 and a bypass nozzle 67 of the bypass flow path B downstream of the nacelle inlet 66. One or more fan exit guide vanes 68 extend radially between the core cowling 61 and fan nacelle 62 to guide flow through the bypass flow path B and can be configured to support portions of the engine 20.

Various components of the engine 20 and nacelle assembly 60 can have different cooling requirements based on the operating conditions of the engine 20 or aircraft. For example, a primary system may have relatively high cooling requirements at takeoff and ground idle, such as one or more of the components of the engine 20 located in a core compartment defined by core cowling 61. High turbine case temperatures at idle can occur due to significantly decreased efficiency of the turbine section 28 and relatively low cooling flows. Relatively high temperatures can occur at takeoff due to an increased power setting of the engine 20. An active clearance control (ACC) system can be most active at high altitudes and moderate power settings, and may be have a design point optimized for cruise conditions and thrust levels. An air oil cooler (AOC) may have excess flow capacity at takeoff due to high fuel flow providing heat rejection through a fuel oil cooler. An environmental control system (ECS) precooler can have low flow at idle due to low bleed temperatures, and moderate flow at take-off due to operation on a lower pressure bleed stage and a high cold side pressure. A secondary system, such as one or more externals of the engine 20, may have relatively higher cooling requirements at other conditions.

Figure 3A:
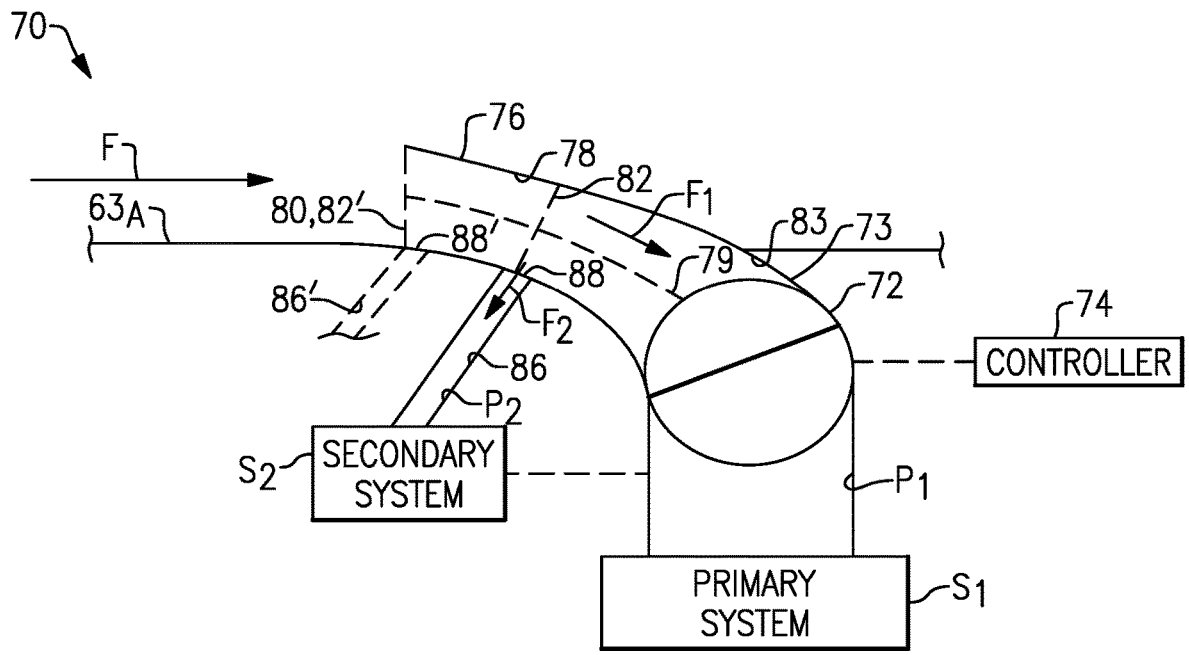
FIG. 3A is a schematic view of an example cooling arrangement with a valve in a first, closed position.
Figure 3B:
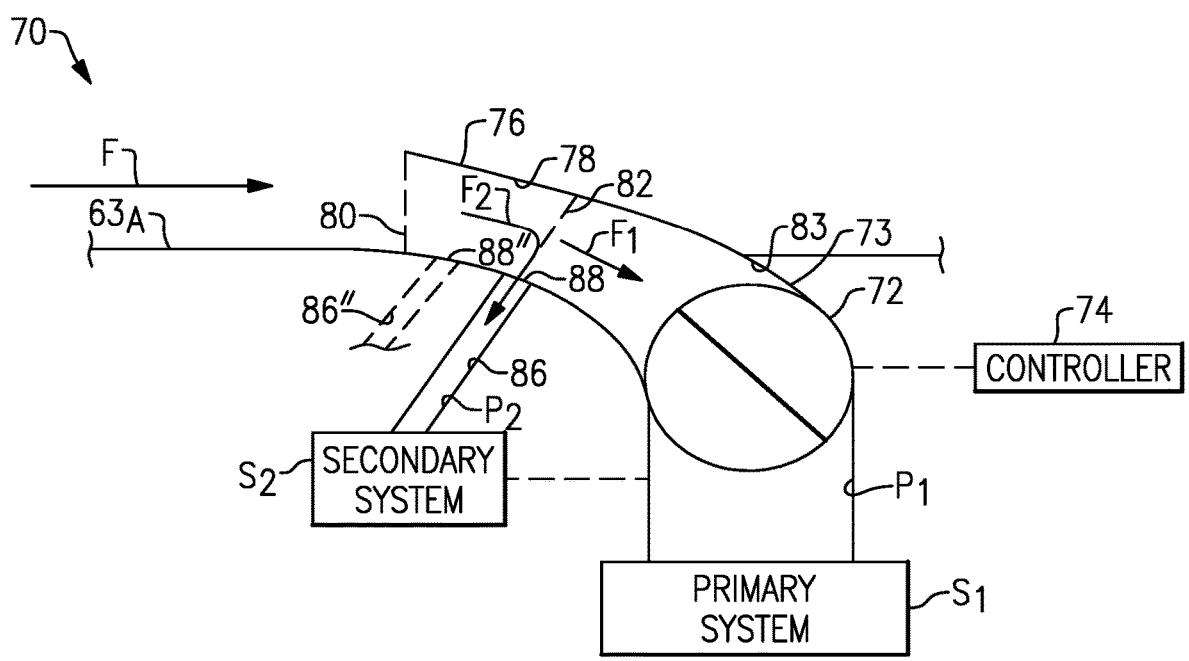
FIG. 3B is a schematic view of the example cooling arrangement of FIG. 3A with the valve in a second, open position.

Referring to FIGS. 3A and 3B, an example cooling arrangement 70 is shown. FIG. 3A illustrates the cooling arrangement 70 with a valve 72 in a first, closed position. FIG. 3B illustrates the cooling arrangement 70 with the valve 72 in a second, open position. The valve 72 can be mechanically, electrically, hydraulically or pneumatically driven, for example, and can be actuated by a controller 74. Controller 74 can be a standalone system or a portion of a full authority digital engine control (FADEC), for example.

The cooling arrangement 70 is configured to receive flow F from a cooling source of the engine 20 or nacelle assembly 60, such as bypass airflow from the bypass flow path B or core airflow from the core flow path C (FIG. 2). The cooling arrangement 70 divides the flow F such that a portion is delivered as flow $F_1$ to a primary (or first) system $S_1$ coupled to a primary cooling flow path $P_1$, and another portion is delivered as flow $F_2$ to a secondary (or second) system $S_2$ via a bleed or secondary cooling flow path $P_2$. Examples of the secondary system $S_2$ can include another portion of the primary system $S_1$, externals components such as generators, valves, and other components having a cooling demand. The valves may be utilized to modulate flow through the primary cooling flow path $P_1$ to the primary system $S_1$. Example valves include ACC valves and ECS valves configured to modulate flow to the ACC or ECS. Other example valves include fuel valves to modulate flow through a fuel system coupled to the engine 20.

In the illustrated example, the cooling arrangement 70 is situated adjacent to inner diameter or surface $63_A$ of bypass duct 63. The cooling arrangement 70 includes a scoop 76 configured to extend into the bypass flow path B. The scoop 76 is configured to divert a portion of flow F from the bypass flow path B through an offtake duct 78 and to a manifold 73 coupled to the valve 72. The offtake duct 78 defines an offtake inlet 80 coupled to the cooling source and an offtake outlet 83 coupled to the valve 72 or manifold 73. The offtake duct 78 can slope gradually from the inner surface $63_A$ of bypass duct 63 toward the valve 72. In another example, the cooling arrangement 70 is situated adjacent to outer diameter or surface $63_B$ of bypass duct 63 (FIG. 2). The valve 72 is coupled to the offtake duct 78 and the primary cooling flow path $P_1$, and is operable to selectively modulate flow $F_1$ between the offtake duct 78 and the primary system $S_1$.

The offtake duct 78 defines a duct axis 79 between the offtake inlet 80 and offtake outlet 83. The offtake duct 78 defines a throat 82 at a location along the duct axis 79. The throat 82 is defined as a minimum cross-sectional area or region of the offtake duct 78 between the offtake inlet and outlet 80, 83. The valve 72 is positioned downstream of the throat 82.

The offtake duct 78 converges along the duct axis 79 from the offtake inlet 80 to the throat 82 such that the throat 82 is defined downstream of the inlet 80, and diverges along the duct axis 79 from the throat 82 towards the offtake outlet 83 and valve 72. In alternative examples, offtake duct 78 has substantially the same cross-sectional area between the throat 82 and the offtake outlet 83, with the throat 82 defined along the duct axis 79 at a position closest to the offtake inlet 80. In some examples, the offtake outlet has the same or greater cross-sectional area as the manifold 73 coupled to the valve 72.

The cooling arrangement 70 includes a bleed passage 86 coupling the offtake duct 78 to the secondary cooling flow path $P_2$. The bleed passage 86 branches from a wall of the offtake duct 78 at a bleed inlet 88. The bleed inlet 88 can be defined at a location between the offtake inlet 80 and the throat 82, inclusive. In the illustrated example, the bleed inlet 88 is defined at the throat 82 downstream of the offtake inlet 80. In one example, throat 82' coincides or is otherwise defined at the offtake inlet 80, and bleed inlet 88' is defined substantially at the throat 82' (FIG. 3A). In another example, bleed inlet 88" is defined at a location between the offtake inlet 80 and the throat 82 (FIG. 3B). The offtake duct 78 can be configured such that flow at the throat 82 has a static pressure equal to or less than a local static pressure of the bypass flow path B when the valve 72 is located in a fully open position. The arrangement of the bleed passage 86 relative to the offtake duct 78 can increase flexibility in the development process to change a desired amount of cooling flow to cool the secondary system $S_2$ without reducing flow to the primary system $S_1$ below a desired level.

The cooling arrangement 70 can be configured to define an inverse relationship between a supply of cooling flow to the primary and secondary cooling flow paths $P_1$, $P_2$. The cooling arrangement 70 can be configured such that the secondary system $S_2$ has full flow when primary system $S_1$ has low cooling requirements during a first operating condition of the engine 20 or aircraft, and has a reduced or minimal flow when the primary system S 1 has relatively high cooling requirements during a second, different operating condition of the engine 20 or aircraft. The cooling arrangement 70 can reduce cooling flow when not required by one of the primary and secondary systems $S_1$, $S_2$, thereby improving fuel efficiency.

The cooling arrangement 70 is configured such that flow through the secondary cooling flow path $P_2$ decreases when the valve 72 is actuated towards the open position, and increases when the valve 72 is actuated towards the closed position. The offtake duct 78 and bleed passage 86 can be configured such that flow through the primary cooling flow path $P_1$ is greater than flow through the secondary cooling flow path $P_2$ when the valve 72 is in an open position. For example, about 20% of the flow F can be diverted from the offtake duct 78 to the bleed passage 86 during ground idle conditions, and about 10% of the flow F can be diverted to the bleed passage 86 during cruise conditions due to increases in flow F through the offtake inlet 80 reducing static pressure at the bleed inlet 88, where 100% of flow F is determined by the maximum flow through offtake inlet 80 when the valve 72 is actuated fully open.

By defining the bleed inlet 88 adjacent to the throat 82, a pressure of the flow $F_2$ through the secondary cooling flow path $P_2$ can be substantially equal to a static pressure of the bypass flow path B when the valve 72 is located in the open position, and can be substantially equal to a total pressure of the bypass flow path B when the valve 72 is located in the closed position. Flow through the bleed inlet 88 can be reduced when the first flow path $P_1$ has high flow by placing the bleed inlet 88 at a location where static pressure is reduced due to flow through the offtake inlet 80. When the valve 72 is closed, the offtake inlet 80 is mostly stagnated and thus the flow is primarily determined by a cross-sectional area of the bleed inlet 88.

Other techniques can be utilized to vary a relationship between the supply of flow F between the primary and secondary cooling flow paths $P_1$, $P_2$. One technique includes adjusting a geometry and venturi effect of the throat 82. Another technique includes changing a location of the bleed inlet 88, such as by situating the bleed inlet 88 on an inner radius of the offtake duct 78 having a relatively lower static pressure (FIGS. 3A and 3B).

Figure 3C:
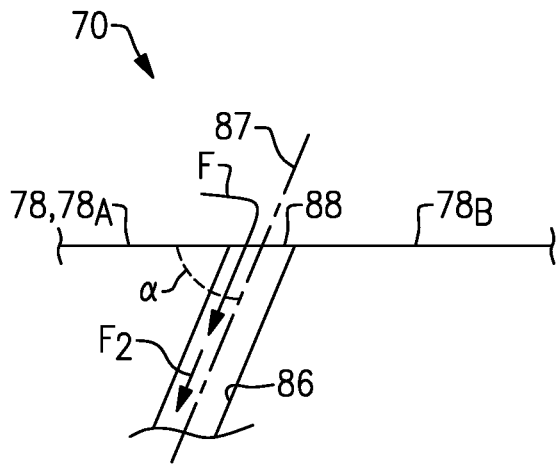
FIG. 3C is a schematic view of selected portions of the example cooling arrangement of FIG. 3A.

Referring to FIG. 3C, with continued reference to FIGS. 3A and 3B, a relationship between flow through the primary and secondary cooling flow paths $P_1$, $P_2$ can be adjusted by changing an angle of the bleed passage 86. The bleed passage 86 defines a passage axis 87 extending through the bleed inlet 88. A localized region of the bleed passage 86 adjacent to the bleed inlet 88 is oriented relative to a localized surface region of the offtake duct 78 to define a passage angle α. The passage axis 87 can be oriented normal or transverse relative to the offtake duct 78. In the illustrated example, the passage angle α is acute such that the bleed passage 86 slopes towards an upstream portion $78_A$ of the offtake duct 78. In this arrangement, incoming flow F turns in an opposite direction into the bleed passage 86, with flow $F_2$ approaching a local static pressure of the offtake duct 78. In another example, the passage angle α is obtuse such that the bleed passage 86 slopes towards a downstream portion $78_B$ of the offtake duct 78, resulting in an increase in flow $F_2$ relative to arrangements having a lesser passage angle α. In some examples, the passage angle α is ±10 degrees from normal. The passage axis 87 may coincide with a reference plane defined through the throat 82, or may be offset such that the reference plane is situated near a perimeter or rim of the bleed inlet 88.

Figure 3D:
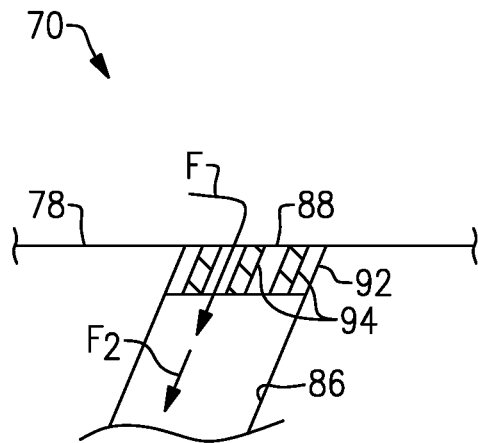
FIG. 3D is a schematic view of a shielding assembly.

Referring to FIG. 3D, the cooling arrangement 70 can include a shielding assembly 92 situated in the bleed inlet 88. The shielding assembly 92 can include on or more guides 94 to divert flow F from the offtake duct 78 in a desired direction into the bleed passage 86.

The cooling arrangement 70 operates as follows. A portion of flow F is diverted by scoop 76 and is communicated to the offtake inlet 80 of the offtake duct 78. The flow F is divided between the primary and secondary cooling flow paths $P_1$, $P_2$ in response to modulating flow F through the offtake duct 78. Controller 74 is operable to cause valve 72 to modulate the flow $F_1$ between the offtake duct 78 and the primary system $S_1$ via the primary cooling flow path $P_1$. Flow $F_2$ is diverted from the offtake duct 78 through bleed inlet 88 and into bleed passage 86, and is delivered to the secondary system $S_2$ via secondary cooling flow path $P_2$.

Figure 4:
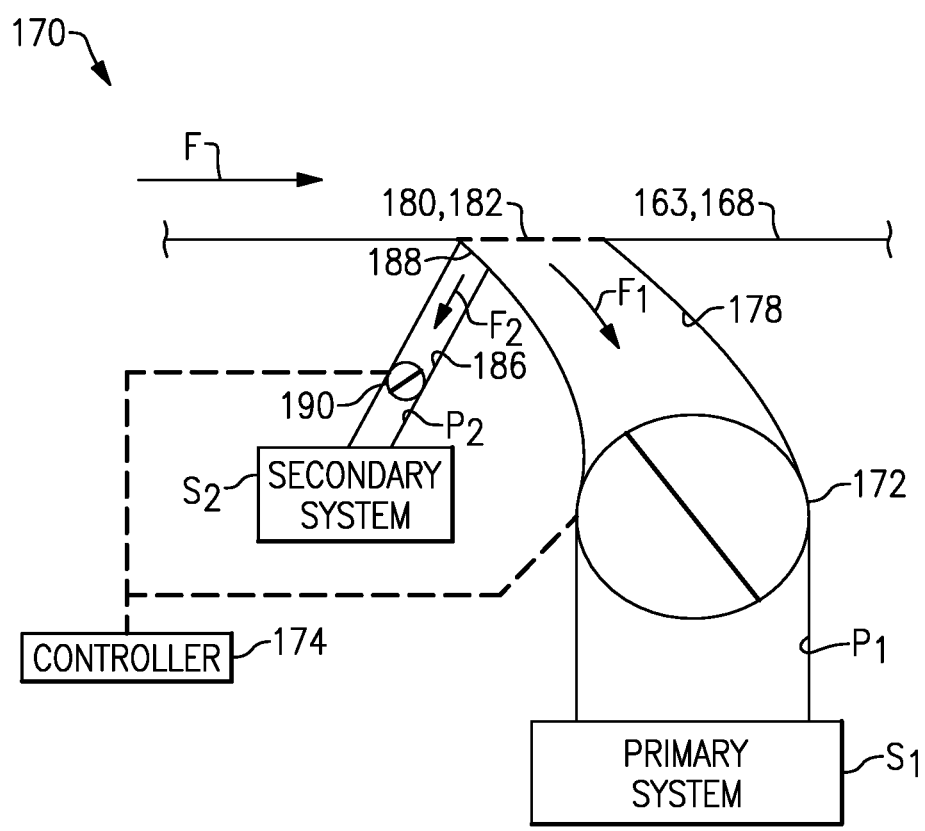
FIG. 4 is a schematic view of an example cooling arrangement according to a second embodiment.

FIG. 4 illustrates a cooling arrangement 170 according to a second embodiment. Offtake inlet 180 is substantially flush with surfaces of bypass duct 163 or fan exit guide vane 168. Throat 182 is defined substantially at the offtake inlet 180. A secondary valve 190 can be positioned between bleed inlet 188 and secondary system $S_2$ to modulate flow $F_2$ through the secondary flow path $P_2$. Controller 174 is operable to adjust valves 172, 190 to modulate a desired flow through and/or between the primary and secondary cooling flow paths $P_1$, $P_2$ during various operating conditions of the engine 20.

By reducing flow to the secondary system $S_2$ when flow is provided to the primary system $S_1$, the impact of the secondary system $S_2$ is reduced. The techniques described herein can provide greater flexibility in changing flow levels to the secondary system $S_2$ during system definition while maintaining available flow to the primary system $S_1$ at a desired level. In addition, fuel efficiency can be increased by reducing the amount of flow consumed by the secondary system $S_2$ at conditions when demand is lower. By delivering flow to the bleed passage 86 when the valve 72 is closed, the effect of deadheading of airflow in the offtake duct 78 caused by the valve 72 being in a closed position can be reduced, thereby improving fuel consumption and acoustic performance. Various systems can benefit from the disclosed arrangement, such as high bypass engine and nacelle combinations, air systems and bleeds, nacelles and airframe integration, and thermal management systems and assemblies.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A method of cooling a propulsion system, comprising:
   communicating airflow to an offtake inlet of an offtake duct, the offtake duct defining a throat;
   modulating the airflow between the offtake duct and a first cooling flow path; and
   diverting a portion of the airflow from the offtake duct to a bleed passage in response to the step of modulating the airflow, the bleed passage including a bleed inlet coupling the offtake duct and a second cooling flow path, the bleed inlet defined at a location between the offtake inlet and the throat, inclusive.

2. The method as recited in claim 1, wherein the bleed inlet is defined at the throat.

3. The method as recited in claim 2, wherein the bleed inlet is spaced from the offtake inlet.

4. The method as recited in claim 1, wherein a valve couples the offtake duct and the first cooling flow path at a position downstream of the throat, and the step of modulating the airflow includes modulating the valve between a closed position and an open position.

5. The method as recited in claim 4, wherein the offtake duct and the bleed inlet are configured such that flow through the first cooling flow path is greater than flow through the bleed passage when the valve is in the open position.

6. The method as recited in claim 1, wherein the bleed inlet is spaced from the offtake inlet.

7. The method as recited in claim 1, wherein the bleed passage defines a passage axis oriented transversely relative to a localized surface region of the offtake duct.

8. The method as recited in claim 7, wherein the bleed passage slopes towards an upstream portion of the offtake duct with respect to an engine longitudinal axis of the propulsion system.

9. The method as recited in claim 1, further comprising moving a valve in the bleed passage between a closed position and an open position to modulate the diverted portion of the airflow through the bleed passage.

10. The method as recited in claim 1, wherein the first cooling flow path is coupled to a first system, and the bleed passage is coupled to a second system, and further comprising causing the second system to modulate the airflow through the first cooling flow path.

11. The method as recited in claim 1, wherein the airflow is communicated from a bypass flow path defined by a fan nacelle.

12. A method of cooling a propulsion system, comprising:
communicating airflow to an offtake inlet of an offtake duct, the offtake duct defining a throat;
modulating the airflow between the offtake duct and a first cooling flow path; and
diverting a portion of the airflow from the offtake duct to a bleed passage, the bleed passage including a bleed inlet coupling the offtake duct and a second cooling flow path, the bleed inlet defined at a location between the offtake inlet and the throat, inclusive; and
wherein the airflow is communicated from a bypass flow path defined by a fan nacelle.

13. The method as recited in claim 12, wherein the offtake inlet is defined at an inner diameter of the bypass flow path.

14. A method of cooling a propulsion system, comprising:
communicating airflow to an offtake inlet of an offtake duct, the offtake duct defining a throat;
modulating the airflow between the offtake duct and a first cooling flow path; and
diverting a portion of the airflow from the offtake duct to a bleed passage, the bleed passage including a bleed inlet coupling the offtake duct and a second cooling flow path, the bleed inlet defined at a location between the offtake inlet and the throat, inclusive;
wherein the bleed inlet is spaced from the offtake inlet; and
wherein the offtake duct defines a duct axis between the offtake inlet and a valve in the first cooling flow path, and the offtake duct converges along the duct axis from the offtake inlet to the throat.

15. The method as recited in claim 14, wherein the offtake duct diverges along the duct axis from the throat towards the valve.

16. A method of cooling a propulsion system, comprising:
communicating airflow to an offtake inlet of an offtake duct, the offtake duct defining a throat;
modulating the airflow between the offtake duct and a first cooling flow path; and
diverting a portion of the airflow from the offtake duct to a bleed passage, the bleed passage including a bleed inlet coupling the offtake duct and a second cooling flow path, the bleed inlet defined at a location between the offtake inlet and the throat, inclusive;
wherein the bleed passage defines a passage axis oriented transversely relative to a localized surface region of the offtake duct, the bleed passage slopes towards an upstream portion of the offtake duct with respect to an engine longitudinal axis of the propulsion system, the bleed passage extends along the passage axis between the bleed inlet and a bleed outlet, and the bleed outlet is axially forward of the bleed inlet with respect to the engine longitudinal axis.

17. The method as recited in claim 16, wherein the offtake duct defines a duct axis between the offtake inlet and a valve in the first cooling flow path, and the offtake duct converges along the duct axis from the offtake inlet to the throat.

18. The method as recited in claim 17, wherein the offtake duct diverges along the duct axis from the throat towards the valve.

19. The method as recited in claim 17, wherein the valve couples the offtake duct and the first cooling flow path at a position downstream of the throat, and the step of modulating the airflow includes modulating the valve between a closed position and an open position.

20. The method as recited in claim 17, wherein the valve interconnects the first cooling flow path and a first system, the bleed passage interconnects the bleed inlet and a second system, and the step of diverting the portion of the airflow occurs such that the second system has full flow when the first system has a low cooling requirement associated with a first operating condition of the propulsor system and such that the second system has a reduced flow when the first system has a relatively high cooling requirement associated with a second, different operating condition of the propulsor system.

21. The method as recited in claim 16, wherein the airflow is communicated from a bypass flow path defined by a fan nacelle.

* * * * *